L. V. MOULTON.
TROLLEY RETRIEVER.
APPLICATION FILED NOV. 7, 1914.

1,176,397.

Patented Mar. 21, 1916.
3 SHEETS—SHEET 1.

Witnesses
Howard H. Yarrington
Marie York.

Inventor
Luther V. Moulton
By Moulton & Livrance
Attorneys

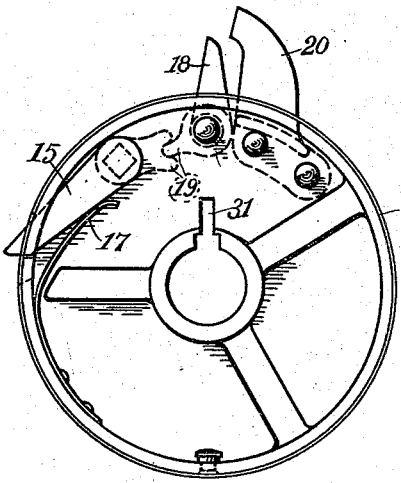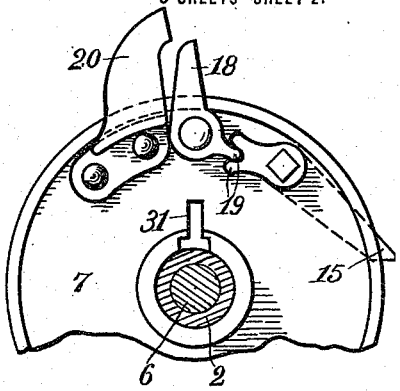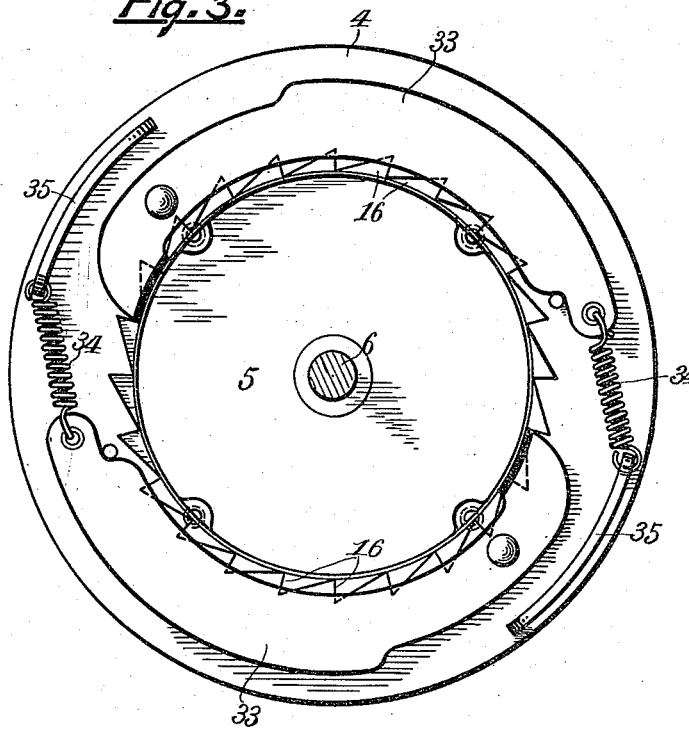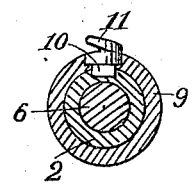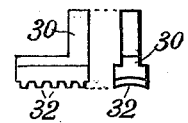

L. V. MOULTON.
TROLLEY RETRIEVER.
APPLICATION FILED NOV. 7, 1914.
1,176,397.
Patented Mar. 21, 1916.
3 SHEETS—SHEET 3.
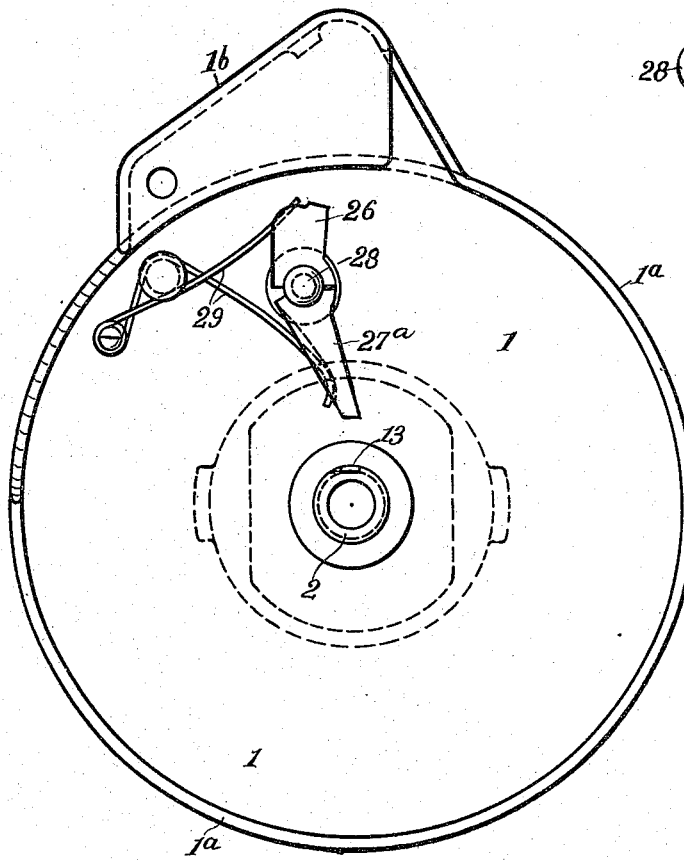
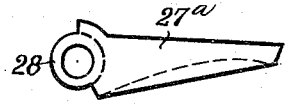
Fig. 12.
Fig. 11.
Fig. 8.
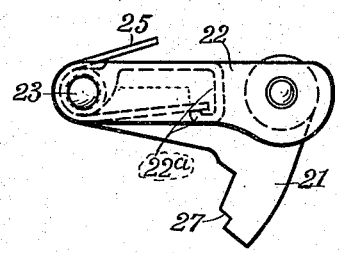
Fig. 9.
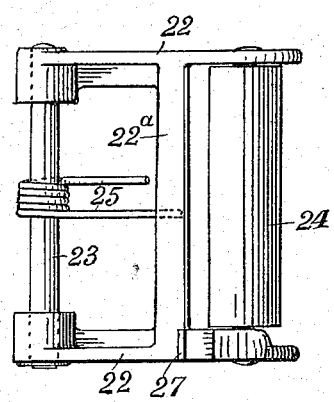
Fig. 10.
Witnesses
Howard H. Yarrington
Marie York
Inventor
Luther V. Moulton
By Moulton & Linnance
Attorneys.
THE COLUMBIA PLANOGRAPH CO., WASHINGTON, D. C.

UNITED STATES PATENT OFFICE.

LUTHER V. MOULTON, OF GRAND RAPIDS, MICHIGAN, ASSIGNOR TO EMILY V. CHAMBERLIN, OF GRAND RAPIDS, MICHIGAN.

TROLLEY-RETRIEVER.

1,176,397.

Specification of Letters Patent.    Patented Mar. 21, 1916.

Application filed November 7, 1914.   Serial No. 870,872.

*To all whom it may concern:*

Be it known that I, LUTHER V. MOULTON, a citizen of the United States of America, residing at Grand Rapids, in the county of Kent and State of Michigan, have invented certain new and useful Improvements in Trolley-Retrievers; and I do hereby declare the following to be a full, clear, and exact description of the invention, such as will enable others skilled in the art to which it appertains to make and use the same.

My invention relates to improvements in trolley retrievers, adapted to pull the trolley pole down below the line conductor and guy wires whenever the trolley wheel leaves the line conductor. Such retrievers are usually provided with a drum on which the trolley cord is wound, a light spring acting on the drum to take up and pay out the cord as the pole moves down and up to follow the line conductor, hereafter called the take-up spring, a strong spring held under tension, hereafter called the retrieving spring, means for automatically connecting the retrieving spring with the drum whenever the trolley wheel leaves the line conductor, and means for rewinding the retrieving spring and disconnecting the same from the drum to permit the trolley wheel to be replaced on the line.

Some of the objects of my invention are—to insure prompt action of the device; to adapt the device to trolley poles having different strengths of lifting springs; to insure certainty of operation; to insure certain and accurate rewinding of the retrieving spring under varying conditions; to provide means for minimizing the shock when the retrieving spring connects with the drum; and to provide the device with various new and useful features hereinafter more fully described and particularly pointed out in the claims.

Figure 2:
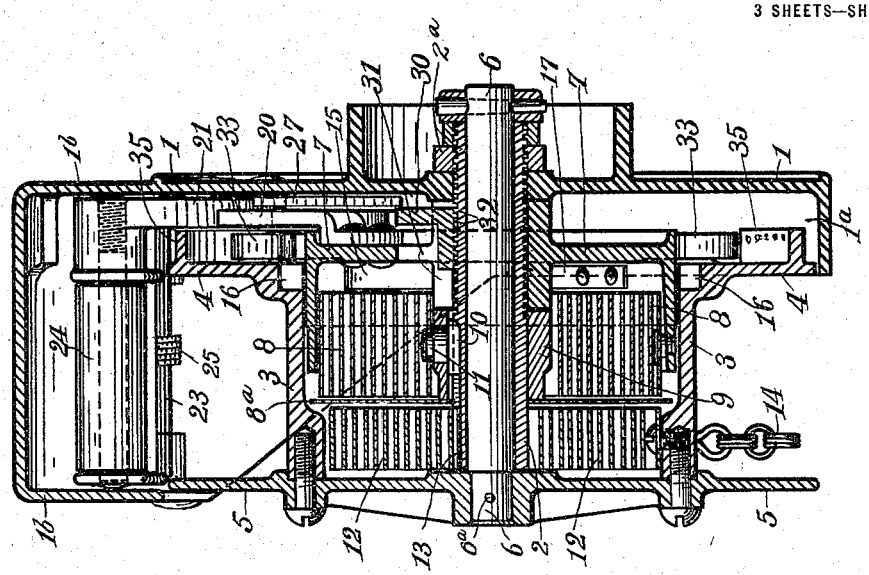
Figure 1:
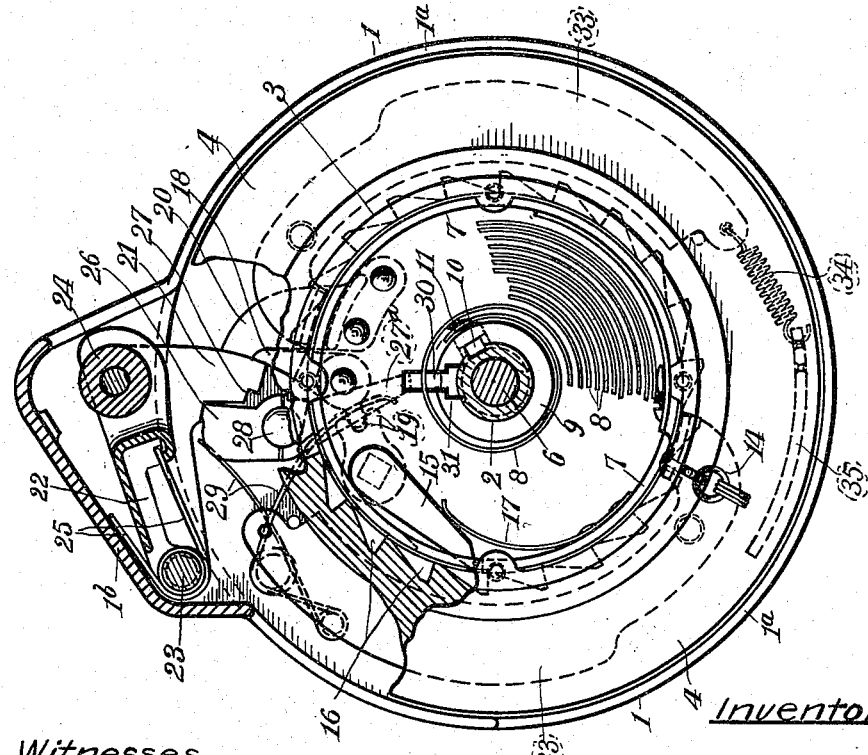

In the accompanying drawings I have shown a preferred embodiment of my invention, in which;

Figure 1 is a sectional elevation of the device with parts broken away to show the construction; Fig. 2 is the same taken at right angles to Fig. 1; Fig. 3 is a detail of the retrieving spring case and parts attached; Fig. 4 is an end elevation of the winding drum, showing the centrifugal brakes; Fig. 5 is the same as Fig. 3 viewed from the opposite side; Fig. 6 is a detail in section of the holding collar for the retrieving spring; Fig. 7 is a detail of the trip key; Fig. 8 is an elevation of the case showing the holding dog and trip arm; Fig. 9 is a side elevation of the detent for holding the retrieving spring wound up; Fig. 10 is a plan view of the same; Fig. 11 is a detail of the holding dog for the detent; and Fig. 12 is a detail of the trip arm for the same.

Like numbers refer to like parts in all of the figures.

A cup-shaped case 1 is provided having the usual means for securing the same to a car and closed by the inner flange 4 of a winding drum spaced apart from the head of the case, thus forming a closed chamber $1^a$ in the case. The case is also provided with a hood $1^b$ at the top and this hood and chamber serve to inclose and protect the operating mechanism for the winding drum 3 which drum is located beneath the hood and provided with a detachable outer head 5 closing the outer end of the drum and forming an outer flange for the same.

6 is a center pin fixed in the head 5 by a pin $6^a$ and extending through the axis of the drum 3, and rotative in a tube or sleeve 2 fixed in the head of the case 1 by screw threads and jam-nuts $2^a$ and projecting within the axis of the drum 3. Journaled on the sleeve 2 near the head of the case is a cup-shaped spring case 7 on which the winding drum 3 is journaled. A strong retrieving spring 8 is arranged in the case 7 and is attached at its outer end to the said case, and at its inner end to a collar 9 on the sleeve 2. Said collar is provided with a key 10 slidably engaging a key-seat 13 in the sleeve and a hook 11 engaging the spring 8, whereby the inner end of the spring is detachably connected to the sleeve.

In the drum 3 is a take-up spring 12 attached to the said drum at its outer end and inserted in the key seat 13 in the sleeve at its inner end.

$8^a$ is a disk between the springs 8 and 12 to keep the same apart.

Pivoted in the spring case 7 and extending through an opening in the periphery thereof, is a pawl 15 engaged with one of the ratchet teeth 16 in the drum 3 by a spring 17 and held out of such engagement by a detent 21, which engages a lever 18 pivoted on the case 7 and connected to the pawl by intermeshing cogs 19. An arm 20 is fixed on the case 7 and extends outside the lever 18 both the arm and the lever being engaged and held by the detent 21. This detent is carried at one end of a frame 22, within the hood 1b and pivoted at one end as at 23, a spring 25 is provided to yieldably engage the detent with the lever 18 and arm 20.

Journaled in the vertically movable end of the frame 22 is a roller 24 which is substantially above the axis of the drum and moved toward the drum by the spring 25 to engage the detent 21 with the lever 18 and arm 20 and moved away from the drum by the trolley cord which is secured to the drum as at 14 and wound on the same engaging the underside of the roller 24 and thence extended upward to the trolley pole and attached thereto.

A dog 26 is pivoted on the head of the case 1 and engages a shoulder 27 in the detent 21 to hold the same raised out of engagement with the lever 18 and arm 20. A releasing arm 27a is connected to the dog by a rule joint 28 and extends toward the axis of the case close to the head of the case and within the path of a trip key 30, when the same is moved close to said head as hereinafter described. Said key is carried around the sleeve 2 in a slot 31 in the hub of the spring case 7 and is slidable therein toward and away from the head of the case 1 and is moved by engaging screw threads 32 in the key and sleeve.

Under some conditions such as a very weak lifting spring or a high line wire, the upward movement of the pole when the wheel leaves the line may not trip the retriever. To prevent this result, centrifugal brakes 33 are pivoted near one end to the inner head 4 of the drum 3, and carried around thereby, the short end of these brakes engage the periphery of the spring case 7 when the other and heavier end of each brake swings outward by centrifugal force, as the drum 3 revolves.

To normally hold the brake out of engagement with the spring case 7, a contractile spring 34 is attached to the heavy end of each brake at one end and to a segment 35 on the head 4 at the other end. These segments have holes at intervals to receive the end of the spring to adjust the tension on the spring.

In operation, the retrieving spring 8 is held under tension by engagement of the detent 21 with the arm 20 and the trip key 30 is close to the head of the case 1 and in position to engage the releasing arm 27. The detent 21 at its lower end also engages the lever 18 and thus overcomes the spring 17 and moves the pawl 15 inward clear of the ratchet teeth 16 in the winding drum. The take-up spring 12 being permanently connected to the winding drum, and not very strong, will merely rotate the said drum and take up the slack of the trolley cord in the usual way, allowing it to unwind and causing it to rewind as the trolley pole follows the changing elevation of the line wire. The spring 25 insures engagement of the detent 21 with the lever 18 and arm 20. Should the trolley wheel leave the line wire, the sudden upward movement of the pole, carrying the wheel will suddenly pull the cord and put a lifting action on the detent frame sufficient to overcome the spring 25 and raise the detent out from engagement with the lever 18 and arm 20, whereupon it is engaged and held up by the dog 26. As the detent rises the lever 18 is first released, and the time intervening before the release of the arm 20 is sufficient to enable the spring 17 to throw the pawl 15 into engagement with one of the ratchet teeth 16 before the arm 20 is released and the retrieving spring 8 comes into action. The device thus obviates a serious difficulty due to the vigorous action of the spring 8 which if released before the pawl 15 is engaged with the drum, would result in injury to, or serious wear of the machine. The combined action of the springs 8 and 12 is sufficient to wind the trolley cord upon the drum 3 and pull the pole below the line wire and guy wires, where it can do no damage.

By the construction described the retrieving action is very prompt and reliable, being practically instantaneous and allowing very little time and very slight rise of the wheel above the line.

To reset the device it is only necessary to pull out the cord and rewind the retrieving spring. During the retrieving action the case 7 has rotated upon the sleeve 2 more or less depending upon the distance that the pole is moved downward. With a stiff lifting spring or low line wire a less number of turns or rotations of the spring case and winding drum would occur, there is thus a variation in the amount of screw threads 32 which act to move the trip key 30 away from the plane of the trip lever 27 and whether this movement be more or less is immaterial for that the retrieving spring must be rewound to the same extent that it unwinds when retrieving to move the key 30 so that it will engage the said lever 27, thus when the spring has been rewound to the same tension as it was in the first instance, the key 30 will engage the lever 27 and thus move the dog 26 out of engagement with the shoulder 27 on the detent and allow the latter to drop within the path of the arm 20 and the lever 18, thus throwing the dog 15 out of engagement with the drum, detaching the spring 8 from connection with the drum and holding the said spring wound up. The wheel can then be replaced on the line and the device will operate as before, merely to take up the slack of the cord until the trolley again leaves the wire. In slacking back on the cord after the detent has dropped, to reengage the wheel with the line wire, the key 30 may engage the arm 27 in which event the rule joint will yield and allow the key to pass the arm on the rewinding movement of the drum.

It will be seen that this device is of such construction that but very little attention need be given it, and that when it leaves the line it must necessarily be properly reset before the trolley can be replaced on the line thus insuring that a careless operator cannot restore the wheel to the line and proceed with the car unless he properly resets the device.

What I claim is:—

1. A trolley retriever comprising a drum on which the cord is wound, a take-up spring to rotate the drum, an independently rotary member, a retrieving spring to rotate said member, a pawl carried by said member to engage and rotate the drum, a lever to hold the pawl out of said engagement, means for holding the lever and said rotary member, and means for releasing the lever and the rotary member in succession when the trolley leaves the line conductor.

2. In a trolley retriever, a winding drum, a cord wound on the drum and connected to a trolley pole, a retrieving spring, means for connecting the spring and drum, means for holding the spring under tension, means for holding the connecting means out of action, and means for successively releasing the connecting means and the spring when the trolley leaves a line conductor whereby the connecting means operates before the spring is released.

3. In a trolley retriever, a retrieving spring normally held out of action, a detent to hold the spring, a dog to hold the detent out of action, a trip lever to move the dog out of action, a movable key to operate the trip lever, and means for moving the key into operative position when the spring is fully wound, and for moving the same out of operative position when the spring is unwound.

4. A trolley retriever, comprising a drum, a frame pivoted at one end, a detent and a roller carried by the other end of the frame, a cord wound on the drum and extending beneath the roller and thence upward and attached to a trolley pole, a retrieving spring within the drum, a pawl connected to the movable end of said spring and adapted to engage the drum, a lever to hold the pawl out of said engagement, an arm connected to the said spring, a detent to engage and hold both the lever and the arm and to release the same in succession.

5. A trolley retriever, comprising a drum, a spring case within the drum, each being independently rotative, a retrieving spring in the case to rotate the same, a pawl carried by the case to engage the drum, a spring to engage the pawl with the arm, a lever to disengage the pawl from the drum, an arm on the case, a detent to engage both the lever and the arm and operating to first release the lever and afterward to release the arm and a cord wound on the drum and adapted to be attached to a trolley pole and also adapted to move the detent out of engagement with the lever and arm when the pole suddenly rises.

6. A trolley retriever, comprising a drum, a spring case in the drum, said drum and case being independently rotative about a common axis, a retrieving spring in the case to rotate the same, a pawl carried by the case to engage and rotate the drum, a spring to engage the pawl with the drum, a lever to hold the pawl out of engagement with the drum and projecting from the case, an arm fixed on the case and projecting beyond the lever, a detent adapted to engage both the lever and the arm, and operating to first release the lever and afterward release the arm, a cord wound on the drum and adapted to be attached to a trolley pole and also adapted to move the detent out of engagement with the lever and arm when the pole suddenly rises.

7. A trolley retriever, comprising a hollow drum, a spring case in the drum, the drum and case being independently rotative, a retrieving spring in the case to rotate the same, a pawl carried by the case and adapted to engage teeth in the drum, a spring to engage the pawl with said teeth, a pivoted lever having cogged connection with the pawl to hold the latter out of said engagement, an arm fixed on the case and projecting beyond the lever, a pivoted frame carrying a roller and a detent at its movable end, said detent to engage both the lever and the arm, a cord wound on the drum and adapted to be attached to a trolley pole, said cord also engaging the roller to move the detent out of engagement when the pole suddenly rises.

8. A trolley retriever, comprising a drum, a spring case, a retrieving spring in the case to rotate the same, a pawl in the case to connect the same with the drum, a lever to hold the pawl out of action, a detent to engage and hold the lever, a dog to engage and hold the detent out of operation, an arm to disengage the dog, a key carried by the drum to engage the arm and release the dog, and means operated by rotation of the case to move the key toward and away from the arm.

9. A trolley retriever, comprising a drum, a cord attached to a trolley pole and wound on the drum, a spring case in the drum, the drum and case each being independently rotative, a retrieving spring in the case to rotate the same, means for connecting the case and drum, a detent adapted to hold the said means out of action and to hold the drum from rotating, means for moving the detent out of action when the cord is suddenly unwound from the drum, a dog to engage and hold the detent, an arm to disengage the dog, a key carried by the case and movable toward and away from the said arm, a sleeve on which the case is rotative and screw threads in the sleeve and key to move the key when the drum rotates.

10. A trolley retriever, comprising a drum and a spring case independently rotative, a retrieving spring in the case to rotate the same, a fixed member on which the case is rotative, means for automatically connecting the drum and case when the spring rotates the case, a detent to hold the case from rotating, means for moving the detent to inoperative position operated by the upward movement of a trolley pole, a dog to hold the detent in said position, a key carried by the case to disengage the dog and movable in the direction of the axis of the case, and engaging screw threads in the key and member to move the key as the case rotates.

11. A trolley retriever, comprising a drum, a cord wound on the same and attached to a trolley pole, a spring case in the drum, the case and drum each being independently rotative, a retrieving spring in the case to rotate the same, means for automatically connecting the case and drum, a detent adapted to hold the connecting means out of action and to hold the case from rotating, means for moving the detent to inoperative position when the pole suddenly moves upward, a dog to hold the detent in said position, an arm to move the dog to inoperative position, a key carried by the case and slidable therein to engage the arm, and a fixed screw engaging the key to move the same in the case into and out of engaging position.

12. A trolley retriever, comprising a drum, a cord wound on the drum and attached to a trolley pole, a case in the drum, the case and drum each being independently rotative, a retrieving spring in the case to rotate the same, a pawl carried by the case to engage teeth in the drum, a spring to move the pawl to engaging position, a pivoted lever having a cogged connection to the pawl to move the same to inoperative position, an arm fixed on the case, a frame above the drum pivoted at one end and carrying a roller and a detent at the other end, said detent to engage both the lever and the arm and said roller engaged by the cord to raise the frame and move the detent to inoperative position, a dog to hold the frame raised, an arm to move the dog to inoperative position, a key carried by the case and movable therein toward and away from the arm, and a fixed screw engaging threads in the key to move the same toward and away from the arm.

13. A trolley retriever, comprising a drum and a spring case independently rotative, a retrieving spring in the case to rotate the same, means for automatically connecting the drum and case, a detent to hold said means out of operation and to hold the case from rotating, means for moving the detent to inoperative position, a dog to hold the detent in said position, an arm connected to said dog by a rule joint whereby it operates to move the dog when moved in one direction and is inoperative when moved in the opposite direction, a key carried by the case and movable therein toward and away from the said arm and a fixed screw engaging threads in the key to move the same when the case rotates.

14. A trolley retriever, comprising a drum, a spring case, a retrieving spring in the case, means for holding the spring under tension comprising a movable detent, means for automatically connecting the spring case to the drum when the spring is released, means for releasing the spring when a trolley pole suddenly rises, consisting of a cord wound on the drum and attached to the pole, and also engaging a roller connected to the detent and movable therewith, and a centrifugal brake carried by the drum and engaging the spring case to increase the tension on the cord when the drum rotates above a predetermined speed.

15. A trolley retriever, comprising a drum, a cord wound on the drum and connected to a trolley pole, a spring case in the drum, the case and drum each being independently rotative, means for automatically connecting the case and drum when the case is rotated by the spring, a detent to normally hold said means out of operation, means for moving the detent to inoperative position operated by sudden increased tension on the cord, and a centrifugal brake carried on the drum and engaging the case when the drum is rotated above a predetermined speed.

In testimony whereof I affix my signature in presence of two witnesses.

LUTHER V. MOULTON.

Witnesses:
FRANK E. LIVERANCE, Jr.,
H. H. YARRINGTON.

Copies of this patent may be obtained for five cents each, by addressing the "Commissioner of Patents, Washington, D. C."

Correction in Letters Patent No. 1,176,397.

It is hereby certified that the name of the assignee in Letters Patent No. 1,176,397, granted March 21, 1916, upon the application of Luther V. Moulton, of Grand Rapids, Michigan, for an improvement in "Trolley-Retrievers," was erroneously written and printed as "Emily V. Chamberlin," whereas said name should have been written and printed as *Emily M. Chamberlin*, as shown by the records of assignments in this Office; and that the said Letters Patent should be read with this correction therein that the same may conform to the record of the case in the Patent Office.

Signed and sealed this 25th day of April, A. D., 1916.

[SEAL.] J. T. NEWTON,

Cl. 191—93. *Acting Commissioner of Patents.*